United States Patent [19]

Kosugi et al.

[11] 3,992,485
[45] Nov. 16, 1976

[54] PROCESS FOR PREPARATION OF WEATHER RESISTANT AND IMPACT RESISTANT RESINS

[75] Inventors: Takumi Kosugi; Shigeki Yasunaga, both of Kobe; Takashi Motoki, Akashi, all of Japan

[73] Assignee: Kanegafuchi Kagaku Kogyo Kabushiki Kaisha, Osaka, Japan

[22] Filed: Aug. 4, 1975

[21] Appl. No.: 601,340

Related U.S. Application Data

[63] Continuation-in-part of Ser. No. 324,818, Jan. 18, 1973, abandoned.

[30] Foreign Application Priority Data

Jan. 27, 1972   Japan.............................. 47-10302

[52] U.S. Cl................................ 260/881; 260/884; 260/885
[51] Int. Cl.² ........................................ C08L 33/08
[58] Field of Search ..................................... 260/881

Primary Examiner—Carman J. Seccuro
Attorney, Agent, or Firm—Moonray Kojima

[57] ABSTRACT

A two stage emulsion polymerization process for preparing resins having both weather resistance and impact resistance. In the first step, there are copolymerized 100 to 80% by weight of an alkyl acrylate having alkyl containing 2 to 8 carbon atoms; 0 to 20% by weight of a monomer containing a vinylidene group copolymerizable therewith and cross-linking monomer to produce an aqueous dispersion of cross-linked copolymer having degree of swelling above 10, gel content above 80% and average particle size of 0.15 to 0.5 microns. Emulsifier in an amount of 0.05 to 1 % by weight is used. In the second step, 5 to 50 parts by weight of the solid copolymer of the cross-linked polymer of step 1 is polymerized in the presence of 50 to 95 parts by weight of a monomer mixture of at least 50% by weight of aromatic vinyl monomer and less than 50% by weight of vinyl monomer copolymerizable therewith.

9 Claims, No Drawings

PROCESS FOR PREPARATION OF WEATHER RESISTANT AND IMPACT RESISTANT RESINS

BACKGROUND OF THE INVENTION

This is a continuation-in-part of Ser. No. 324,818 filed Jan. 18, 1973, now abandoned.

The present invention relates to a process for the preparation of weather resistant and impact resistant resins.

A favorable impact resistant thermoplastic composition has been prepared by blending an elastomer with a resinous polymer of polymerizing a vinyl monomer in the presence of an elastomer. For example, the preparation of many resin compositions, as well as ABS (acrylonitrile-butadiene-styrene) resin, has been heretofore reported.

Polybutadiene or the like is used as the elastomer in most of these resin compositions.

Although such resins have excellent resistance to impact, they have weak resistance to weather and various mechanical properties thereof and are rapidly adversely affected with the elapse of time because, it is believed, of the existence of double bonds in the main chain.

A chemically saturated elastomer has been used for improving the aging of such resins and the resistance to impact of hard and brittle resins.

However, there have been observed various defects in thermoplastic compositions otained by mixing such hard and brittle resins with a chemically saturated elastomer, or by polymerizing a monomer to afford a hard and brittle polymer in the presence of a chemically saturated elastomer. For example, one of the defects is low mchanical strength and when such compositions are injection molded, strong orientation of molding marks are produced.

The impact strength of thermoplastic resins containing an elastomer mainly depends upon glass transition temperature of the elastomer, the state of dispersion of the elastomer in the resin, and appropriate compatibility of the elastomer with the resin.

For improving the compatibility of the chemically saturated elastomer with the resin, for example, graft polymerication of the monomer is carried out by introducing unsaturated bonds into the side chain of the saturated elastomer.

However, this solution leaves much to be desired because the introduction of unsaturated bonds is very expensive.

SUMMARY OF THE INVENTION

As a result of various investigations into improving the resistance to impact of styrenic polymers by using an alkyl acrylate polymer, the present inventors have discovered that cross-linking structure helps to disperse elastomer in resin, thus producing a much larger influence on the improvement of the resistance to impact. Also, in the above case, the size of the elastomer particle determined in an aqueous dispersion is introduced into the glassy polymer. Moreover, the inventors have found that the resistance of impact strength can be improved highly when the elastomer is in a specific range of the cross-linking structure, namely in a degree of swelling of above 10 and a gel content of above 80%.

Briefly, the present invention encompasses a process for preparing resins having the advantageous properties of weather resistance and impact resistance which comprises two stages of emulsion polymerization. In the first stage, there are copolymerized 100 to 80% by weight of an alkyl acrylate having alkyl contaning 2 to 8 carbon aoms, 0 to 20% by weight of a monomer contaning a vinylidene group copolymerizable therewith and cross-linking monomer, to produce an aqueous dispersion of cross-linked copolymer having a degree of swelling of above 10, containing a gel content of above 80%a, and an average diameter of paticle of 0.15 to 0.5 microns. One or more emulsifiers we used in an aount of 0.05 to 1% by weight. In the subsequent second stage, there are polymrized in the presence of 5 to 50 parts by weight (in an amount of the solid copolymer) of an aqueous dispersion of the resulting cross-linked copolymer of the first stage, 50 to 95 parts by eight of a monomer mixture of at least 50% by weight of an aromaic vinyl monomer and less than 50% by weight of vinyl monomer copolymerizable therewith thereby to afford a hard and brittle copolymer resin component.

DETAILED DESCRIPTION OF PREFERRED EMBODIMENTS

A graft copolymer substrate having a lower glass transition temperature is preferred. There may be used an alkyl acrylate of which the alkyl group ha 2 to 8 carbon atoms, which may be straight or branched.

Examples of the alkyl acrylate are ethyl acrylate, propyl acrylate, butyl acrylate, n-octyl acrylate, and 2-ethylhexyl acrylate. Examples of vinylidene monomer copolymerizable with the alkyl acrylate are alkyl acrylate of which the alkyl group has carbon atoms other than 2 to 8; aromaic acrylic ester such as phenyl acrylate, or benzyl acrylate; methacrylic ester such as methyl methacrylate, ethyl methacrylate, butyl methacrylate or benzyl methacrylate; aromatic vinyl compound such as styrene, vinyl toluene or alphamethylstyrene; unsaturated nitrile such a acrylonitrile or methacrylonitrile; vinyl halide such as vinyl chloride or vinyl bromide; vinylidene halide such as vinylidene chloride, or vinylidene fluoride; and vinyl ester such as vinyl formate, vinyl acetate, methyl vinyl ester or lauryl vinyl ester. Since most of these monomers elevate the glass transition temperature of the graft copolymer substrate, the amount of the monomer should be not more than 20% by weight.

The alkyl crylate must be copolymerized with a cross-linking monomer. The cross-linking monomer involves a monomer having many terminal ethylene groups which are not conjugated at 1,3-positions. Examples of such a monomer are divinyl benzene; mono- or polyethylene glycol iacrylate such as ethylene glycol diacrylae, diethylene glycol diacrylate or triethylene glycol diacrylate; mono-or poly-ethylene glycol dimethacrylate such as ethylene glycol dimethacrylate, diethylene glycol dimethacrylate or triethylene glycol dimethacrylate; diallyl compound such as diallyl phthalate, diallyl sebacate or diallyl maleate; and allyl unsaturated carboxylate such as allyl acrylate or alyl methacrylate. It is preferred that the graft copolymer substrate have a gel content as high as possible without reduction of degree of swelling. Thus, the gel content should be above 80%, and the degree of swelling should be above 10. Therefore, the amount of cross-linking monomer for that of th alkyl acrylate is 0.01 to 5% by weight, and 0.05 to 1.0% by weight thereof is preferrable for improving the mechanical properties.

The gel content and degree of swelling vary with type or amount of cross-linking monomer, polymerization temperatures, amount or type of initiator and existence of a transfer agent. Under ordinary conditions, the peferred amount of divinyl benzene or diallyl compound is below 0.5% by weight, the preferred amount of mono-or poly-ethylene glycol diacrylate is below 0.8A by weight, and the preferred amount of mono- or poly-ethylene glycol dimethacrylate is below 1.0% by weight. In particular, mono- or polyethylene glycol diacrylate and mono- or poly-ethylene glycol dimethacrylate are suitable for preparing a substrate having a high gel content and a high degree of swelling.

An aqueous dispersion of an elastic alkyl acrylate for the graft copolymer substrate can be prepared by an ordinary method for aqueous emulsion polymerization using the conditions set forth herein. Usual anionic, cationic or non-ionic emulsifiers for the emulsion polymerization may be used in the amounts set forth herein.

The size of the elastomeric particle in an aqueous dispersion is dependent on the impact resistance desired. The elastomeric particle size in an aqueous dispersion is dispersed in the resin grafted with almost same size introduced by cross-linking. The preferred size of the particle is 0.15 to 0.5 microns. When a particle of below 0.15 micron is used, the impact resitance is not improved. When a particle of above 0.5 micron is used, the mechanical strength decreases. A more preferred size is 0.2 to 0.4 micron. The preferred size of particle can be obtained by regulating the amount of emulsifier used and by adjusting the amount of water used as the dispersant. The amount of emulsifier is preferably from 0.05 to 1.0% by weight for the monomer, and the amount of water is preferably from 50 to 300% by weight for that.

In addition to the emulsifier, it is profitable to add auxiliary agents for emulsifier such as sodium napphalene sulfonate-formaldehyde condensate, mineral salts for agglomeration of particles, or other builders. An initiators, ordinary persulfates, hydrogen peroxide, and redox polymerization initiators as a combination of oxidant and reductant may be used. Transfer agent or other additives for polymerization may be added, too. A preferable temperature is from 30° to 80° C, although the reaction temperature can be adopted without limitation.

At first the total amount of monomer and cross-linking monomer may be supplied, or the total amount or partial amount thereof may be added continously or intermittently during polymerization. The concentration of the cross-linking monomer may be changed during this time. 95 to 50 parts by weight of a monomer mixture consisting of at least 50% by weight of an aromatic vinyl compound and less than 50% by weight of a vinyl monomer copolymerizable therewith to afford a hard and brittle polymer is graft copolymerized in the presence of an aqueous dispersion containing 5 to 50 parts by weight of the graft copolymerization substrate. When the total comprises 100 parts by weight, of course, the parts can also be referred to as weight percents.

The aromatic vinyl compound may be styrene; ring-alkyl-styrene such as vinyltoluene; alpha-alkylstyrene such as alpha methylstyrene; alpha-alkyl-ring-alkyl-styrene such as isopropenyltoluene or halogenostyrene such as chlorostyrene or bromostyrene. These compounds may be used singly or in combination.

As the vinyl monomer copolymerizable with more than 50% by weight of the aromatic vinyl compound and to afford a hard and brittle resin component, there may be used, for example, methacrylic ester such as methyl methacrylate or ethyl methacrylate or ethyl methacrylate; unsaturated nitrile such as acrylonitrile or methacrylonitrile; acrylic ester such as methyl acrylate or ethyl acrylate; vinyl ester such as vinyl formate or vinyl acetate; and vinyl halide such as vinyl chloride or vinyl bromide. These monomers may be used singly or in a mixture of two or more.

For obtaining good moldability and hardness of the thermoplastics, the aromatic vinyl compound should be no more than 50% by weight. For example, a useful combination of styrene and acrylonitrile is 60:40 to 90:10, and a useful combination of styrene and methyl methacrylate is 50:50 to 90:10. Especially favorable results can be attained by using a combination of styrene, methyl methacrylate and acrylonitrile.

For improving impact resistance of the obtained hard and brittle polymer, the elastomeric substrate of graft copolymer should be not less than 5% by weight. When its content exceeds 50% by weight, the effect of graft polymerization decreases markedly and the moldability is reduced. Impact resistance can be improved by mixing the graft copolymer with the hard and brittle copolymer obtained by using the same monomer as in the graft polymerization.

The graft copolymer is prepared in the presence of a previously prepared aqueous dispersion of the graft substrate according to ordinary emulsion polymerization. Emulsifiers, polymerization initiators or transfer agents may be added. When these other agents are used, there may be the same as used in the preparation of the graft copolymer substrate. Different substances or agents may also be used. Ordinary polymerization conditions such as temperature can be adopted, although they may be the same or different as in the preparation of the graft copolymer substrate. The total amount of graft monomers may be supplied at one time, or the total or partial amount thereof may be added continuously or intermittently during the polymerization.

The objective polymers can be isolated by freezing, spray drying or coagulation with salt, from the emulsion of the graft copolymerizatioin, and washed and dried. In this case, antioxidants, thermostabilizers, ultra-violet absorbants, or agents for improving the moldability may be added. These polymers can be coagulated with the same sort of aqueous copolymer dispersion as the graft monomer. The obtained graft polymers can be molded by a molding machine for ordinary thermoplastic resins.

Presently preferred and practical embodiments of the present invention are illustratively shown in the following examples and referential examples. Parts therein are mean parts by weight.

EXAMPLE I a. Preparation of the graft copolymer substrate:

In a glass reactor equipped with a thermometer, a stirrer, a reflex condenser and a mouth for introducing nitrogen gas, there were mixed the components shown in Table 1.

TABLE 1

| | |
|---|---|
| Distilled water | 100 parts |
| Butyl acrylate | 100 parts |

TABLE 1-continued

| | |
|---|---|
| Sodium dodecylbenzene sulfonate | 0.05 part |
| Sodium naphthalene sulfonate-formaldehyde condensate | 0.2 part |
| Sodium sulfate | 0.6 part |

Triethylene glycol dimethacrylate was added thereto as a cross-linking monomer in an amount described in Table 3, and Nos. I-1 to I-5 were assigned to the respective cases. The resultant mixture was emulsified with stirring in a nitrogen atmosphere at about 60° C and 0.05 parts of potassium persulfate was added to initiate the polymerization. One hour and 2 hours after the beginning of the reaction, each 0.05 part of sodium dodecylbenzene sulfonate was added twice to stabilize the dispersion. The polymerization yield was above 95%. Table 3 shows properties of the graft copolymer substrate obtained.

b. Preparation of the graft copolymer;

In the same reactor equipped with monomer introducing apparatus as in the preparation of the above graft copolymer substrate, the components shown in Table 2 were supplied.

TABLE 2

| | |
|---|---|
| Graft copolymer substrate (in a solid polymer) | 20 parts |
| Distilled water | 250 parts |
| Sodium formaldehyde sulfoxylate | 0.4 part |
| Disodium ethylene diamene tetraacetate | 0.01 part |
| Ferrous sulfate heptahydrate | 0.0025 part |

A mixture of 53 parts of styrene, 27 parts of acrylonitrile, 0.3 parts of cumene hydroperoxide and 0.4 part of tertdodecyl marcaptan were added thereto at about 60° C in a nitrogen atmosphere continuously for 6 hours. Then, the polymerization was completed in an hour. The conversion rate was above about 95%.

One part of anti-oxidizing agent (2,6-ditertiary butyl-p-cresol) was added to the resulting aqueous dispersion, which was salted out with 1 part of 10% aqueous solution of calcium chloride. The coagulated product was heated at 80° C, dehydrated, washed and dried to give the polymer. The product was subjected to a heating extruder equipped with a screw and a vacuum exit mouth at 230° to give pellet resins. The resing were subjected to an injector, heat ab about 240° C and then a metal mold heated at 60° C. Table 3 shows the existence of the mold spots, mechanical strength and fluidity showing the moldability of the resulting test pieces. Since mechanical properties decrease generally with elevation of fluidity, the fluidity is desired to be kept constant for easy comparison.

REFERENTIAL EXAMPLE I

Example I is repeated except that cross-linking monomer (triethylene glycol dimethacrylate) was not used in the preparation of graft copolymer substrate in Example I (a) and that 0.3 parts of tert-dodecylmercaptan was used in the preparation of the graft copolymer in Example I (b). The results are shown as Referential Example I-1.

For comparison, there are shown in Table 3 physical or mechanical properties of a commercially available ABS resin (Referential Example I-2) prepared by graft copolymerization of styrene and acrylonitrile in 20 parts of the butadiene polymer substrate.

TABLE 3

| Example | I-1 | I-2 | I-3 | I-4* | I-5* | Ref I-1 | Ref I-2 |
|---|---|---|---|---|---|---|---|
| Triethylene Glycol dimeacrylate (part) | 0.2 | 0.5 | 1.0 | 3.0 | 10.0 | 0 | ABS resin on market |
| gel content | 94.8 | 95.0 | 95.5 | 95.9 | 97.1 | 1 | |
| Degree of swelling | 13.8 | 11.8 | 9.7 | 8.2 | 4.5 | — | |
| Particle diameter (micron) | 0.30 | 0.35 | 0.30 | 0.31 | 0.29 | 0.24 | |
| molding mark | none | none | none | none | none | present | none |
| Izod impact strength | 16.4 | 12.5 | 9.8 | 9.6 | 6.5 | 8.2 | 25.6 |
| Tensile strength | 443 | 442 | 440 | 451 | 448 | 422 | 420 |
| Elongation | 38 | 50 | 38 | 50 | 49 | 42 | 23 |
| Fluidity | 6.8 | 8.0 | 6.2 | 5.8 | 5.8 | 7.0 | 7.0 |

Notes:
(*)In the preparation of the graft copolymer 0.5 part of tertiary dodecylmercaptan is used.
Degree of swelling: Amount by weight of toluene absorbed by the solid graft copolymer substrate when it is dipped in toluene at room temperature for 48 hours.
Gel content: Ratio (%) of the insoluble part in toluene in the same conditions as above.
Degree of swelling = $(W_1 - W_2)/W_3$
Gel Content = $W_2/W_0 \times 100$, Wherein $W_0$ represents the amount by weight of sample collected before dipping, $W_1$ represents the amount by weight of the polymer after swelling and $W_2$ represents the amount by weight of the polymer after redrying.
Particle diameter (microns): Calculated from the turbidity at a wave length of 546 m$\mu$.
Izod impact strength: Value (kg.cm/cm²) with ¼ inch of notch at 23° C according to the ASTM D 256-56.
Tensile Strength: Value (kg/cm²) measured at 23° C according to the ASTM D256-56.
Elongation: Value (%) to the breaking point according to the ASTM D 256-56.
Fluidity: 10² cm³/sec × Value measured at 230° C under loading with 100 kg/cm³ by a nozzle (1 mm × 10 mm) of the polymer flow tester.

From the foregoing data, it is proven that a graft copolymer substrate having a higher gel content and a higher degree of swelling can improve mechanical properties without molding spots. Thus, a degree of swelling above 10 and a gel content above 80% are preferred for the graft copolymer substrate.

EXAMPLE II

Various cross-linking monomers were used in lieu of triethylene glycol dimethacrylate in Example I in the preparation of the graft copolymer substrate. The reactions were effected by using 0.08 part of divinyl benzene (Example II-1), 0.15 parts of allyl methacrylate (Example II-2), 0.15 part of ethylene glycol dimethacryate (Example II-3) and 0.12 part of ethylene glycol diacrylate (Example II-4). Example II-1 was effected as in Example I except that 0.03 parts of sodium dodecylbenzene sulfonate was used in the preparation of the graft copolymer substrate. Mechanical properties of the obtained graft copolymer are shown in Table 4.

TABLE 4

| Example No. | II-1 | II-2 | II-3 | II-4 |
|---|---|---|---|---|
| Cross-linking monomer | Divinyl benzene | Ally methacrylate | Ethylene glycol dimethacrylate | Ethylene glycol diacrylate |
| Amount of same | 0.08 | 0.15 | 0.15 | 0.12 |
| Degree of swelling | 10.8 | 10.5 | 13.3 | 11.8 |
| Gel content (%) | 92 | 91.5 | 95.5 | 94.8 |
| Particle diameter (micron) | 0.31 | 0.28 | 0.29 | 0.30 |
| Molding mark | none | none | none | none |
| Izod impact strength (kg.cm/cm$^2$) | 11.5 | 10.7 | 15.4 | 14.8 |
| Tensile strength (kg/cm$^3$) | 445 | 435 | 438 | 456 |
| Elongation (%) | 46 | 30 | 32 | 44 |
| Fluidity × 10$^{-2}$ cm$^3$/sec | 7.8 | 6.4 | 6.7 | 7.2 |

Analysis of the foregoing data proves the mono-or poly-ethylene glycol dimethacrylate and mono-or poly-ethylene glcyol diacrylate as the cross-linking monomer affords especially favorable resutls.

EXAMPLE III

Example I was repeated except that 0.2 parts of triethylene glycol dimethacrylate was used and that the amount of water in the dispersion, amount of emulsifier, amount of supplemental agent for emulsification and amount of salt were varied, as shown in Table 5, in the preparation of the graft copolymer substrate in Example I (a). These are as numbered. The substrate shows a gel content of about 93% and a degree of swelling of 13 to 14.

TABLE 5

(parts by weight)

| Example No. | Distilled water | Sodium dodecylbenzenesulfonate | Sodium formaldehyde sulfoxylate | Sodium sulfate | Particle diameter (micron) |
|---|---|---|---|---|---|
| III-1 | 200 | 0.2 | — | — | 0.12 |
| III-2 | 100 | 0.1 | — | — | 0.15 |
| III-3 | 100 | 0.2 | 0.2 | 0.4 | 0.20 |
| III-4 | 100 | 0.1 | 0.2 | 0.6 | 0.27 |
| III-5 | 100 | 0.05 | 0.2 | 0.7 | 0.35 |
| III-6 | 100 | 0.05 | 0.1 | 0.7 | 0.50 |

Table 6 shows the moldability and mechanical properties of the graft copolymers obtained from the graft copolymer substrate according to the method of Example I(b).

TABLE 6

| Example No. | Izod impact strength (kg.cm/cm$^2$) | Tensile strength (kg/cm$^3$) | Elongation (%) | Fluidity × 10$^{-2}$ cm$^3$/sec. |
|---|---|---|---|---|
| III-1 | 6.6 | 488 | 35 | 4.5 |
| III-2 | 10.4 | 475 | 48 | 6.2 |
| III-3 | 12.1 | 469 | 35 | 5.8 |
| III-4 | 15.4 | 444 | 61 | 6.4 |
| III-5 | 18.7 | 425 | 65 | 6.3 |
| III-6 | 10.3 | 421 | 27 | 7.2 |

The foregoing data proves that a particle diameter of 0.15 to 0.5 microns is suitable.

EXAMPLE IV

Example I was repeated except that 2-ethylhexyl acrylate was used in lieu of butyl acrylate and 0.2 parts of triethylene glycol dimethacrylate was used as the cross-linking monomer in the preparation of the graft copolymer substrate. Table 7 shows the moldability and mechanical properties of the copolymer.

EXAMPLE V

Example I was repeated except that 90 parts of butyl acrylate and 10 parts of acrylonitrile were used and 0.2 part of triethylene glycol dimethacrylate was used as the cross-linking monomer in the preparation of the graft copolymer substrate. In this case, the graft copolymer substrate showed a gel content of 92.5% and a degree of swelling of 15.0 The aqueous dispersion showed a parparticle diameter of 0.31 microns. Mechanical properties of the graft copolymer are as shown in Table 7.

EXAMPLE VI

Example I was repeated except that 0.2 part of triethylene glycol dimethacrylate was used as the cross-linking monomer in the preparation of the graft copolymer substrate and that 43 parts of sytrene, 21 parts of acrylonitrile, 16 parts of methyl methacrylate, 0.25 parts of tertiary dodecylmercaptan are used. Table 7 shows the mechanical properties of the obtained product.

TABLE 7

| Example No. | Izod impact strength (kg.cm/cm$^2$) | Tensile strength (kg/cm$^3$) | Elongation (%) | Fluidity × 10$^{-2}$ cm$^3$/sec. |
|---|---|---|---|---|
| IV | 11.5 | 456 | 42 | 7.5 |
| V | 15.8 | 432 | 40 | 6.8 |
| VI | 12.5 | 410 | 21 | 9.2 |

For examining the weather resistant properties, irradiation was effected with a fade meter for 300 hours. In this case, the black panel was heated at about 63° C, and the irradiation was carried out with a carbon arch. Examples I-1, I-2, III 5, VI and commercially available ABS resin of Referential Example I-2 were adapted as test samples. Table 8 shows the results. The data proves that excellent weather resistant properties are observed in comparison with that of the commercially available ABS resin in the test of the irradiation period within 300 hours.

TABLE 8

| Test sample | | Ex I-1 | Ex I-2 | Ex III-5 | Ex VI | ABS |
|---|---|---|---|---|---|---|
| Izod impact strength kg.cm/cm$^2$ | Before irrad | 16.4 | 12.5 | 18.7 | 12.5 | 25.6 |
| | 100 hr after | 16.0 | 13.0 | 17.2 | 13.0 | 15.4 |
| | 200 hr after | 16.6 | 11.0 | 16.5 | 13.0 | 13.2 |
| | 300 hr after | 6.2 | 4.8 | 6.8 | 10.3 | 12.7 |
| Tensile strength kg/cm$^3$ | Before irrad | 443 | 422 | 425 | 410 | 420 |
| | 100 hr after | 445 | 415 | 430 | 415 | 303 |
| | 200 hr after | 460 | 450 | 442 | 420 | 251 |
| | 300 hr after | 510 | 530 | 485 | 438 | 225 |
| Elongation (%) | Before irrad | 38 | 50 | 65 | 21 | 23 |
| | 100 hr after | 40 | 43 | 55 | 25 | 2 |
| | 200 hr after | 27 | 35 | 50 | 20 | 1 |
| | 300 hr after | 14 | 12 | 9 | 14 | 2 |

EXAMPLE VII

The criticality of amount of emulsifier used was tested by the following experiments and comparison experiments: (1) Examples I-1 and III-4 set forth above; and Examples Vii-1 and VII-2; and in comparison Contrast Exaples VII-3 and VII-4. These Examples VII-1,2,3,4 were performed using the same procedure as Example I-1, except that the amount of emulsifying agents were varied as shown in Table 9, in the preparation of the graft copolymer substrate in Example I (a). Table 9 also shows the properties of the copolymer substrate obtained, for each of the example. Table 10 shows the results of the tests of the graft copolymer substrates obtained, namely, the presence or absence of mold spot and physical properties of injection molded samples and fluidity which indicate the moldability.

be added. Example VII-3 and 4 show the cases of using emulsifiers above the upper range of the invention. They produced inferior particle diameter, gel content and degree of swelling. In Table b 10, they also showed inferior molding mark and inferior Izod impact strength.

The foregoing description is for purposes of illustrating the principles of the invention. Numerous variations and modifications thereof would be apparent to the worker skilled in the art. All such variations and modifications are to be considered to be within the spirit and scope of the invention.

What is claimed is:

1. A process for preparing resins having the properties of weather resistance and impact resitance, comprising the steps of A. emulsion copolymerizing 100 to 80% by weight of an alkyl acrylate having alkyl group containing 2 to

TABLE 9

| Example No. | I-1 | III-4 | VII-1 | VII-2 | Contrast VII-3 | Contrast VII-4 |
|---|---|---|---|---|---|---|
| Distilled water* | 100 | 100 | 100 | 100 | 100 | 100 |
| (a) sodium dodecyl-benzene substrate (SBS)** | 0.05 | 0.1 | 0.05 | 0.70 | 1.70 | 2.00 |
| (b) additional SBS** | 0.1 | 0.1 | none | 0.1 | 0.10 | none |
| (c) sodium naphthalenesulfonate formaldehyde condensate** | 0.2 | 0.2 | none | 0.2 | 0.2 | none |
| Sodium sulfate** | 0.6 | 0.6 | none | 0.6 | 0.6 | none |
| (a)+(b)+(c) total emulsifier (weight %) | 0.35 | 0.40 | 0.05 | 1.00 | 2.00 | 2.00 |
| Particle diameter (micron) | 0.30 | 0.27 | 0.30 | 0.15 | 0.10 | 0.05 |
| Gel content (%) | 94.8 | 93.2 | 92.8 | 88.8 | 75.8 | 0 |
| Degree of swelling | 13.8 | 14.5 | 15.4 | 18.2 | 25.0 | — |

Notes:
*parts by weight
**weight percent; parts by weight based on 100 parts.

TABLE 10

| | I-1 | III-4 | VII-1 | VII-2 | Contrast VII-3 | Contrast VII-4 |
|---|---|---|---|---|---|---|
| molding mark | none | none | none | none | very slight | present |
| Izod Impact strength | 16.4 | 15.4 | 17.2 | 11.1 | 6.8 | 2.5 |
| Tensile Strength | 443 | 444 | 455 | 482 | 480 | 438 |
| % elongation | 38 | 61 | 55 | 48 | 38 | 62 |
| Fluidity | 6.8 | 6.4 | 6.2 | 7.0 | 3.4 | 7.3 |

Note:
for units of measurements of the above, see previous tables.

Examples I-1, III-4, VII-1 and VII-2 all showed superior properties in the above Tables. Example VII-1 shows the case of using lower limit of emulsifier. In this case, when the suspension stability of suspension polymerization becomes lower, the sodium sulfate cannot 8 carbon atoms, 0 to 20% by weight of a monomer containing a vinylidene group copolymerizable therewith in the presence of 0.05 to 1% by weight of one or more emulsifiers, and 0.01 to 5% by weight of cross-linking monomer, whereby the amount of said emulsifier and cross-linking monomer are adjusted to thereby produce an aqueous dispersion of cross-linked copolymer having a degree of swelling above 10, a gel content above 80% and an average particle diameter of 0.15 to 0.5 micron; and B. polymerizing in the presence of 5 to 50 parts by weight of solid of said cross-linked copolymer in an aqueous dispersion, 50 to 95 parts by weight of a monomer mixture consisting essentially of at least 50% by weight of an aromatic vinyl monomer and less than 50% by weight of an unsaturated nitrile copolymerizable therewith.

2. Process of claim 1, wherein said alkyl acrylate is selected from the group consisting of ethyl acrylage, propyl acrylate, butyl acrylate, n-octyl acrylate, and 2-ethylhexyl acrylate; and wherein said monomer containing a vinylidene group is selected from the group consisting of alkyl acrylate with an alkyl group having carbon atoms excluding 2 and 8, pheyl acrylate, benzyl acrylate, methyl methacrylate, ethyl methacrylate, butyl methacrylate, benzyl methacrylate, styrene, vinyl toluene, alpha methyl styrene, acrylonitrile, methacrylonitrile, vinyl chloride, vinyl bromide, vinylidene chloride, vinylidene fluoride, vinyl formate, vinyl acetate, methyl vinyl ester, and lauryl vinyl ester.

3. Process of claim 1, wherein said cross-linking monomer is in an amount of from 0.05 to 1.0% by weight and is selected from the group consisting of divinyl benzene, ethylene glycol diacrylate, diethylene glycol diacrylate, triethylene glycol diacrylate, ethylene glycol dimethacrylate, diethylene glycol dimethacrylate, triethylene glycol dimethacrylate, diallyl phthalate, diallyl sebacate diallyl maleate, allyl acrylate and allyl methacrylate.

4. Process of claim 2, wherein the divinyl benzene or diallyl compound is used in an amount of below 0.5% by weight, or the mono- or poly-ethylene glycol diacrylate is used in an amount of below 0.8% by weight, or the mono- or poly-ethylene glycol dimethacrylate is used in an amount of below 1.0% by weight.

5. Process of claim 1, wherein said particle size is between 0.2 to 0.4 micron.

6. Process of claim 2, wherein further is added sodium naphthalene sulfonate formaldehyde condensate, mineral salt, ordinary persulfates or hydrogen peroxide, redox polymerization initiators, and transfer agent.

7. Process of claim 1, wherein all of said monomer and said cross-linking monomer is added at the start of polymerization, or continuously or intermittently during polymerization.

8. Process of claim 1, wherein said aromatic vinyl monomer is selected from the group consisting of styrene, vinyl toluene, alpha methyl styrene, isopropyenyl toluene, chlorostyrene, bromostyrene and mixtures thereof, and said unsaturated nitrile is selected from the group consisting of acrylonitrile and methacrylonitrile and mixtures thereof.

9. Process of claim 8, wherein said unsaturated nitrile is used together with a monomer selected from the group consisting of methyl methacrylate, ethyl methacrylate, butyl methacrylate, benxyl methacrylate and mixtures thereof.

* * * * *